US012682281B2

(12) United States Patent
Vandikas et al.

(10) Patent No.: US 12,682,281 B2
(45) Date of Patent: Jul. 14, 2026

(54) REINFORCED FEDERATED LEARNING UTILIZING MULTIPLE SPECIALIZED MACHINE LEARNING AGENTS

(71) Applicant: Telefonaktiebolaget LM Ericsson (publ), Stockholm (SE)

(72) Inventors: Konstantinos Vandikas, Solna (SE); Aneta Vulgarakis Feljan, Stockholm (SE); Burak Demirel, Älvsjö (SE); Marin Orlic, Bromma (SE); Alessandro Previti, Stockholm (SE); Alexandros Nikou, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 712 days.

(21) Appl. No.: 18/022,584

(22) PCT Filed: Aug. 25, 2020

(86) PCT No.: PCT/SE2020/050816
§ 371 (c)(1),
(2) Date: Feb. 22, 2023

(87) PCT Pub. No.: WO2022/045937
PCT Pub. Date: Mar. 3, 2022

(65) Prior Publication Data
US 2023/0316131 A1 Oct. 5, 2023

(51) Int. Cl.
*G06N 20/00* (2019.01)

(52) U.S. Cl.
CPC .................................... *G06N 20/00* (2019.01)

(58) Field of Classification Search
CPC .................................................... G06N 20/00
(Continued)

(56) References Cited

U.S. PATENT DOCUMENTS 10,289,962 B2    5/2019  Vinyals et al.
11,954,685 B2 *  4/2024  Cartella .............. G06Q 20/401
(Continued)

FOREIGN PATENT DOCUMENTS

CN        109719721 A    5/2019
EP          3553710 A1   10/2019
WO      2020115273 A1    6/2020

OTHER PUBLICATIONS

International Search Report and Written Opinion of the International Searching Authority, PCT/SE2020/050816, mailed Apr. 22, 2021, 15 pages.
(Continued)

*Primary Examiner* — Andrew Joseph Rudy
(74) *Attorney, Agent, or Firm* — Sage Patent Group

(57) ABSTRACT

Methods and central nodes for developing machine-learning models, the method including receiving, at a central node, at least one episode including a plurality of changes of an environment. The method further includes analysing the episode to extract observations and grouping the observations from among the plurality of observations into a plurality of groups of similar observations. A first machine learning agent is then trained using a first group of similar observations from among the plurality of groups of similar observations, and a second machine learning agent is trained using a second group of similar observations from among the plurality of groups of similar observations, wherein the second group of similar observations is different to the first group of similar observations. The central node obtains a central machine-learning model based on an output from at least one of the trained first machine learning agent and the trained second machine learning agent.

20 Claims, 9 Drawing Sheets

(58) Field of Classification Search
USPC .......................................................... 706/12
See application file for complete search history.

(56) References Cited

U.S. PATENT DOCUMENTS

| | | | | |
|---|---|---|---|---|
| 12,211,048 | B2 * | 1/2025 | Anunciacao | ............ G06F 18/23 |
| 2018/0165603 | A1 | 6/2018 | Van Seijen et al. | |
| 2019/0061147 | A1 | 2/2019 | Luciw | |
| 2019/0232488 | A1 | 8/2019 | Levine et al. | |
| 2021/0240277 | A1 * | 8/2021 | Iliffe-Moon | ......... G06V 20/597 |
| 2021/0342692 | A1 * | 11/2021 | Mellempudi | .......... G06N 3/098 |

OTHER PUBLICATIONS

Ghosh, D., et al., "Divide-And-Conquer Reinforcement Learning," Published as a conference paper at ICLR Apr. 27, 2018, 14 pages.

Liu, B., "Lifelong Federated Reinforcement Learning: A Learning Architecture For Navigation in Cloud Robotic Systems," IEEE Robotics and Automation Letters, vol. 4, Issue: 4, May 13, 2019, 9 pages.

McMahan, H.G., et al., "Communication-Efficient Learning of Deep Networks from Decentralized Data," Proceedings of the 20th International Conference on Artificial Intelligence and Statistics (AISTATS) 2017, W&CP vol. 54, 2017, 11 pages.

Mnih, V., et al., "Human-Level Control Through Deep Reinforcement Learning," vol. 518, Nature, Feb. 26, 2015, 13 pages.

Nadiger, C., et al., "Federated Reinforcement Learning For Fast Personalization," 2019 IEEE Second International Conference on Artificial Intelligence and Knowledge Engineering (AIKE), 5 pages.

Sutton, R. S., et al., "Reinforcement Learning: An Introduction," 2nd Ed., in progress, A Bradford Book, The MIT Press, Cambridge, Massachusetts, London, England © 2014, 2015, 352 pages.

Zhuo, H. H., et al., "Federated Deep Reinforcement Learning," Computer Science, Submitted Jan. 24, 2019, 9 pages.

* cited by examiner

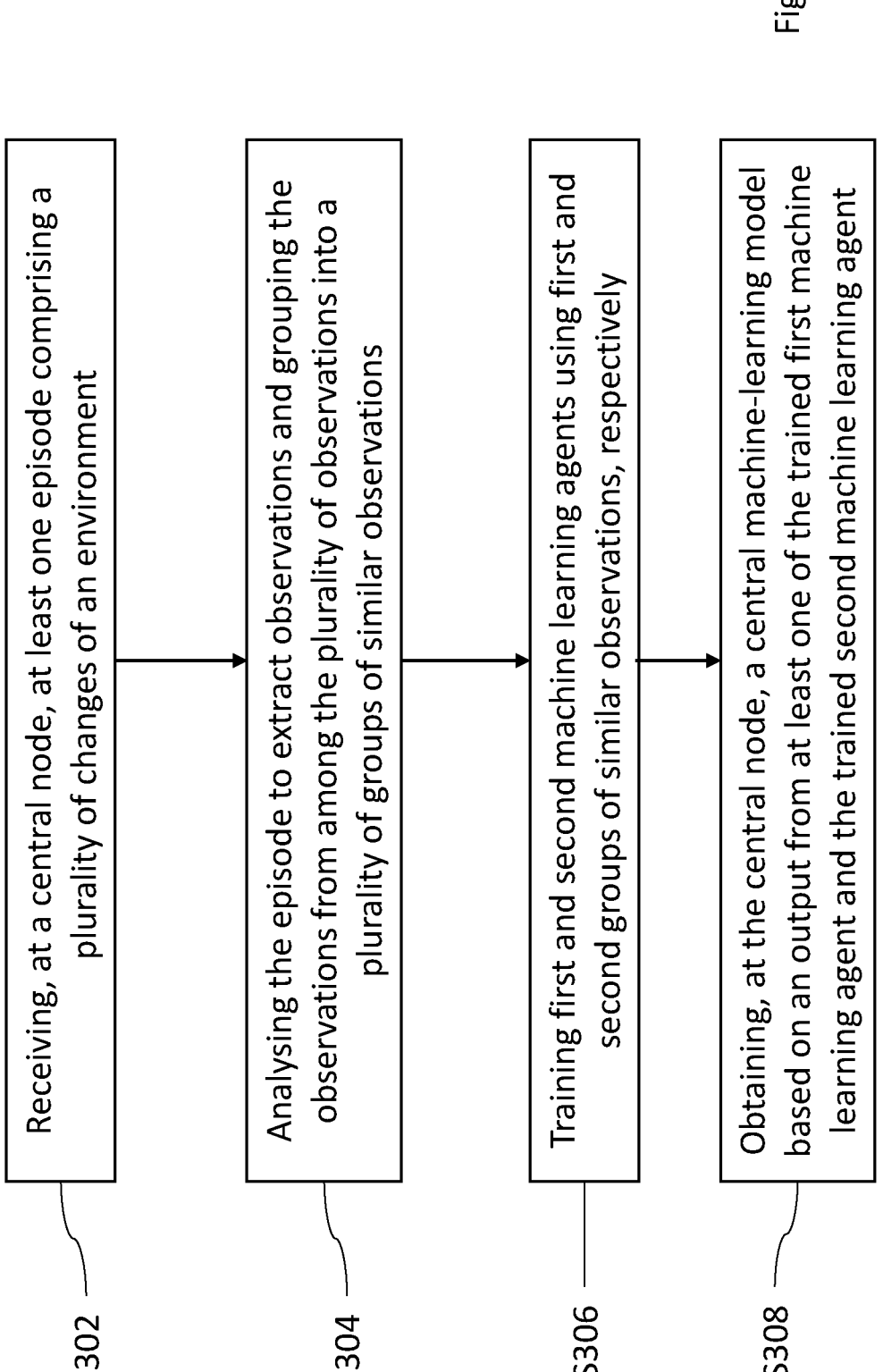

Figure 3

S302 — Receiving, at a central node, at least one episode comprising a plurality of changes of an environment S304 — Analysing the episode to extract observations and grouping the observations from among the plurality of observations into a plurality of groups of similar observations S306 — Training first and second machine learning agents using first and second groups of similar observations, respectively S308 — Obtaining, at the central node, a central machine-learning model based on an output from at least one of the trained first machine learning agent and the trained second machine learning agent

REINFORCED FEDERATED LEARNING UTILIZING MULTIPLE SPECIALIZED MACHINE LEARNING AGENTS

CROSS REFERENCE TO RELATED APPLICATIONS

This application is a 35 U.S.C. § 371 national stage application of PCT International Application No. PCT/SE2020/050816 filed on Aug. 25, 2020, the disclosure and content of which is incorporated by reference herein in its entirety.

TECHNICAL FIELD

Embodiments described herein relate to methods and apparatus for developing a machine-learning model.

BACKGROUND

Conventionally, machine learning (ML) models may be developed at a centralized network node, using a centralized data set that is available at the centralized network node. For example, a global hub of a network may comprise a global dataset that can be used to develop a machine-learning model. Typically, a large, centralized dataset is required to train an accurate machine-learning model.

The need for a centralized data set to train a machine learning model may be supplemented by employing distributed machine learning techniques. One example of a distributed learning technique is federated learning (FL). By employing a distributed machine learning technique, an initial machine-learning model may be trained in a worker node (a follower node), using a dataset that is locally available at the worker node, where the dataset may also be locally compiled at the worker node (for example, using data collected at the worker node from the worker node's environment).

Distributed machine learning techniques allow updated machine-learning models to be trained at worker nodes within a network, where these updated machine-learning models have been trained using data that may not have been communicated to, and may not be known to, the centralized node (where the centralized node may provide the initial machine-learning model). In other words, an updated machine-learning model may be trained locally at a worker node using a dataset that is only accessible locally at the worker node and may not be accessible from other nodes (other worker nodes or centralized nodes) within the network.

It may be that the local set of data at a worker node comprises sensitive or otherwise private information that is not to be communicated to other nodes within the network. As an example of this, communications network operators, service and equipment providers are often in possession of vast global datasets, arising from managed service network operation and/or product development verification. Such data sets are generally located at a global hub. FL is a potential technology enabler for owners of such datasets and other interested parties to exploit the data, sharing learning without exposing raw data.

FIG. 1 illustrates schematically a typical FL system. The system of FIG. 1 may execute a round of FL to train a current global ML model using the following processes. Initially, a current global ML model is selected by the central server (for example, a centralized network node) as shown in Step 1. Then, a set of worker nodes is selected, each of which receives a copy of the current global ML model from the central server as shown in Step 2. Prior to the exchange of data between the server and nodes, further processes may be performed to ensure the security and secrecy of data exchanges between the server and nodes. An example of such a further process is the negotiation of a cryptographic mask. For simplicity, the further processes relating to ensuring security and secrecy of data exchanges between the server and nodes are not illustrated in FIG. 1, and are not discussed further herein. After the worker nodes have received a copy of the current global ML model, each worker node then trains an updated ML model using local data, without uploading the local data to the central server, as shown in Step 3. Then, the updated ML model parameters from the worker nodes are sent to the central server, and the central server aggregates the received ML models (typically by averaging) to construct an improved global ML model as shown in Step 4.

In some situations, conventional FL methods may not provide an optimal solution. Conventional FL methods typically form an updated ML model based on a simple averaging of a number of node versions of a ML model; a simple averaging of a number of node versions of a ML model may introduce bias into the updated ML model, as the node versions of the ML model may have been developed using a number of unbalanced local data sets available at each node. Also, FL methods are most suitable for applications where decoupling of model training from the need of direct access to the raw training data is required. In applications where there is a dynamic interaction between an agent and an environment, a standard FL system may not provide timely and accurate results. For situations where standard FL may not provide good modelling results, aspects of Reinforcement Learning (RL) may be incorporated in order to improve modelling.

RL allows a ML agent to learn by attempting to maximise a reward for a series of actions utilising trial-and-error. RL modelling agents are typically closely linked to the system (environment) they are being used to model/control, and learn through experiences of performing actions that alter the state of the environment. By contrast, conventional FL systems typically operate on stored data without direct input into and response from an environment. A further benefit provided by RL systems is the ability to potentially arrive at advantageous environment states that have not naturally arise, as a result of the influence of actions on the environment; by contrast ML systems learn from recorded data so cannot directly influence an environment to cause a new (potentially advantageous) environment state.

FIG. 2 illustrates schematically a typical RL system. In the architecture shown in FIG. 2, an agent receives data from, and transmits actions to, the environment which it is being used to model/control. For a time t, the agent receives information on a current state of the environment $S_t$. The agent then processes the information $S_t$, and generates an action to be taken $A_t$. This action is then transmitted back to the environment and put into effect. The result of the action is a change in the state of the environment with time, so at time t+1 the state of environment is $S_{t+1}$. The action also results in a (numerical, typically scalar) reward $R_{t+1}$, which is a measure of effect of the action $A_t$ resulting in environment state $S_{t+1}$. The changed state of the environment $S_{t+1}$ is then transmitted from the environment to the agent, along with the reward $R_{t+1}$. FIG. 2 shows reward $R_t$ being sent to the agent together with state $S_t$; reward $R_t$ is the reward resulting from action $A_{t-1}$, performed on state $S_{t-1}$. When the agent receives state information $S_{t+1}$ this information is then processed in conjunction with reward $R_{t+1}$ in order to determine the next action $A_{t+1}$, and so on. The actions are selected by the agent from a number of available actions with the aim of maximising the cumulative reward.

RL systems allow dynamic interaction between the agent and environment, but typically lack the ability to retain data locally as is provided by FL systems. It is therefore desirable to provide a system incorporating elements of RL and FL, allowing local (rather than central) retention of data and also a more direct interaction between a ML agent and a system being modelled. The resulting system incorporating elements of FL and RL may be referred to as a Federated Reinforcement Learning (FRL) system.

An example of a FRL system is proposed in "Federated Deep Reinforcement Learning" by Zhuo, H. H. et al., available at https://arxiv.org/abs/1901.08277 as of 3 Aug. 2020. This document proposes a deep RL framework to federatively build models of high-quality for agents with consideration of their privacies, which is referred to as Federated deep Reinforcement Learning (FedRL). The privacy of data and models is protected using Gaussian differentials on the information shared with other nodes when updating local node models. In the system proposed for two nodes (A and B), instead of using federated averaging a two-player game where A's best reward (and corresponding Deep Q-Network (DQN)) is transferred to agent B's best reward by using a Gaussian noise function which is negotiated between A and B. The system proposed in "Federated Deep Reinforcement Learning" is limited to two "players" (nodes). Also, the system is configured to select the best action from the two options (one per player) for each state of an environment, while discarding the other action. As a consequence, there is a danger of the system overfitting to one data set and therefore failing to fit the available data as a whole, resulting in a decrease in the accuracy of the actions selected over time.

SUMMARY

It is an object of the present disclosure to provide a method, apparatus and computer readable medium which at least partially address one or more of the challenges discussed above. In particular, it is an object of the present disclosure to provide a FRL system incorporating benefits from FL and RL systems, which is suitable for use in dynamic situations (such as communication networks, for example) where some traditional ML techniques may not be suitably responsive.

The present disclosure provides a method for developing a machine-learning model. The method comprises receiving, at a central node, at least one episode comprising a plurality of changes of an environment, and analysing the episode to extract observations and grouping the observations from among the plurality of observations into a plurality of groups of similar observations. The method further comprises training a first machine learning agent using a first group of similar observations from among the plurality of groups of similar observations, and also training a second machine learning agent using a second group of similar observations from among the plurality of groups of similar observations, wherein the second group of similar observations is different to the first group of similar observations. The method also comprises obtaining, at the central node, a central machine-learning model based on an output from at least one of the trained first machine learning agent and the trained second machine learning agent. By using different groups of similar observations to train different machine learning agents, the method may provide machine learning agents specialised in different environment states, such that the central node may draw on different machine learning agents in different states to obtain beneficial action proposals.

In some aspects of embodiments, the observations may be grouped according to similarity using machine reasoning techniques, wherein the machine reasoning techniques may comprise logic based mechanisms. Grouping the observations using machine reasoning may provide an accurate and efficient way to obtain the groups of similar observations.

In some aspects of embodiments, the central node may obtain a first machine learning model from the trained first machine learning agent and a second machine learning model from the trained second machine learning agent, and may further combine the first machine learning model and the second machine learning model to obtain the central machine learning model. By using results from plural machine learning models, the reliability and accuracy of the central machine learning model may be improved.

In some aspects of embodiments, the first machine learning agent and second machine learning agent may be trained using reinforcement learning. Reinforcement learning may be particularly suitable for training the machine learning agents in some situations, in part due to the particular characteristics of reinforcement learning discussed above.

In some aspects of embodiments, the environment may be a $3^{rd}$ Generation Partnership Project, 3GPP, network, and the observations may be grouped based on Key Performance Indicator, KPI, degradation metrics. Also, the central machine learning model may be used to suggest a network modification to help address KPI degradation. Addressing KPI degradation is an example of a role to which some aspects of embodiments may be particularly well suited, due to the nature of 3GPP network environments.

The present disclosure also provides a central node configured to develop a machine learning model, the central node comprising processing circuitry and a memory containing instructions executable by the processing circuitry. The central node may be operable to receive at least one episode comprising a plurality of changes of an environment, and initiate an analysis of the episode to extract observations and group the observations from among the plurality of observations into a plurality of groups of similar observations. The central node may be further operable to initiate the training of a first machine learning agent using a first group of similar observations from among the plurality of groups of similar observations and also initiate the training of a second machine learning agent using a second group of similar observations from among the plurality of groups of similar observations, wherein the second group of similar observations is different to the first group of similar observations. The central node may further obtain a central machine-learning model based on an output from at least one of the trained first machine learning agent and the trained second machine learning agent. Some of the advantages provided by the central node may be as discussed above in the context of the method for developing a machine learning model.

BRIEF DESCRIPTION OF DRAWINGS

The present disclosure is described, by way of example only, with reference to the following figures, in which:

FIG. 3 is a flowchart of a method in accordance with aspects of embodiments;

DETAILED DESCRIPTION

For the purpose of explanation, details are set forth in the following description in order to provide a thorough understanding of the embodiments disclosed. It will be apparent, however, to those skilled in the art that the embodiments may be implemented without these specific details or with an equivalent arrangement.

Embodiments of the present disclosure provide methods for using combinations of federated learning (FL) and reinforcement learning (RL) techniques to develop a machine learning (ML) model. A method in accordance with aspects of embodiments is illustrated by FIG. 3, which is a flow chart showing process steps of a method for developing a ML model. Methods in accordance with aspects of embodiments introduce the concept of extracting, from an episode comprising a number of changes to an environment (system), observations that are then grouped into groups of similar observations. Each observation is a change between an initial state (5) and a final state (s'), along with the action (a) which led to the change between initial and final states and the effect of the change (as indicated by a reward, r). An episode comprises all of the changes to an environment within a given time period; essentially an episode can be considered as a series of observations.

Figure 1:
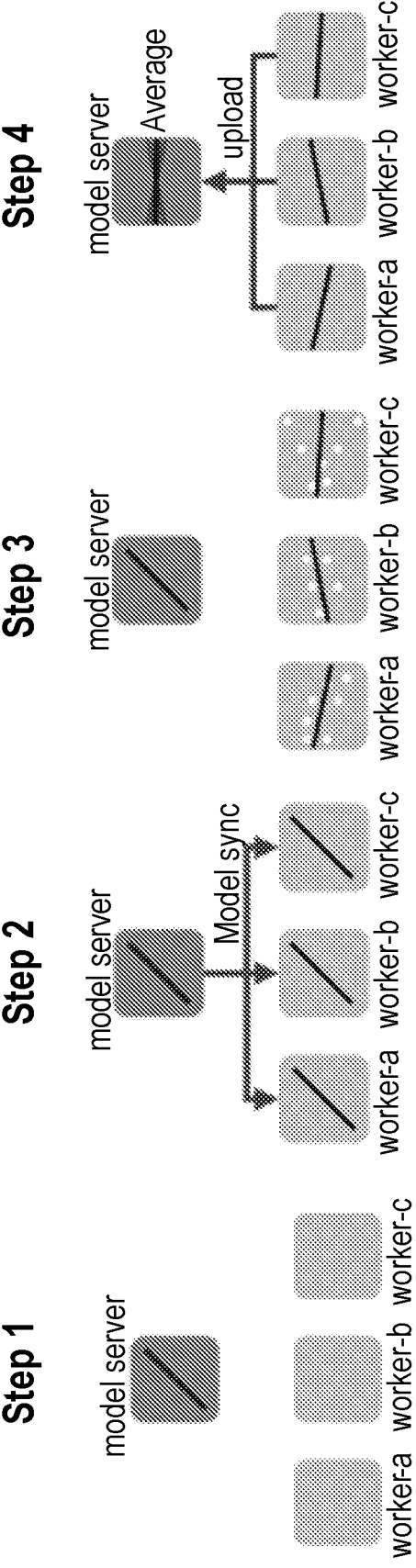
FIG. 1 is a schematic diagram of a FL system.
Figure 2:
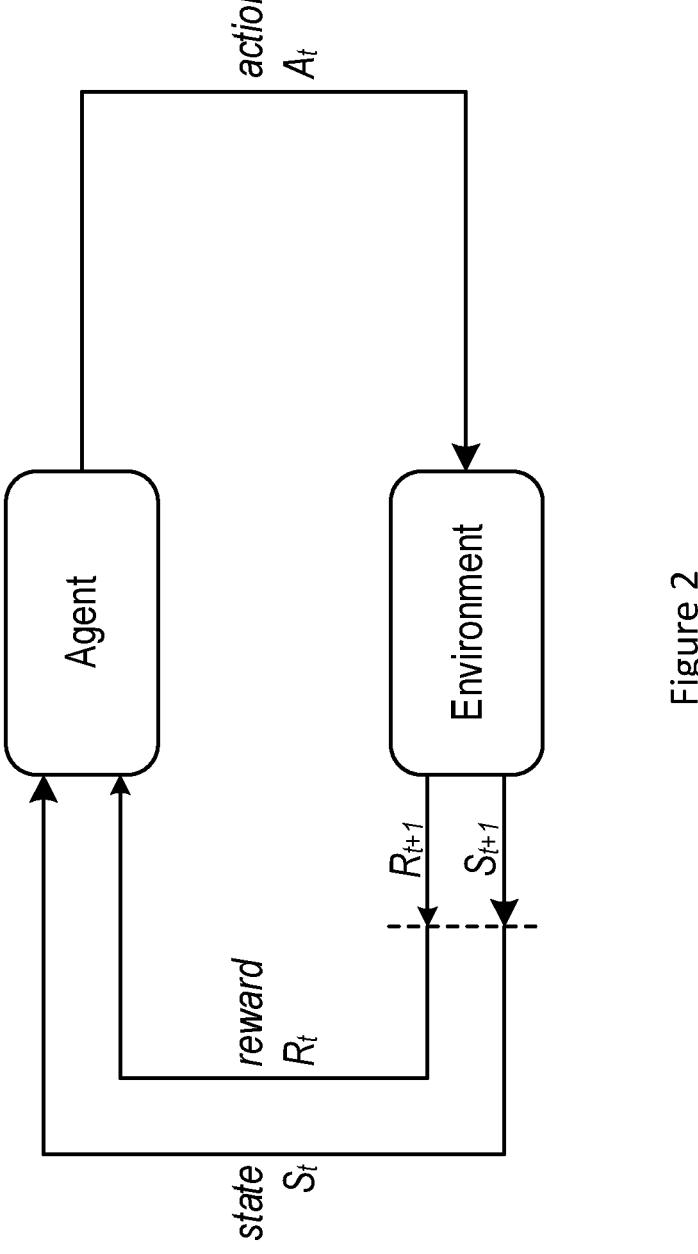
FIG. 2 is a schematic diagram of a RL system.
Figure 4:
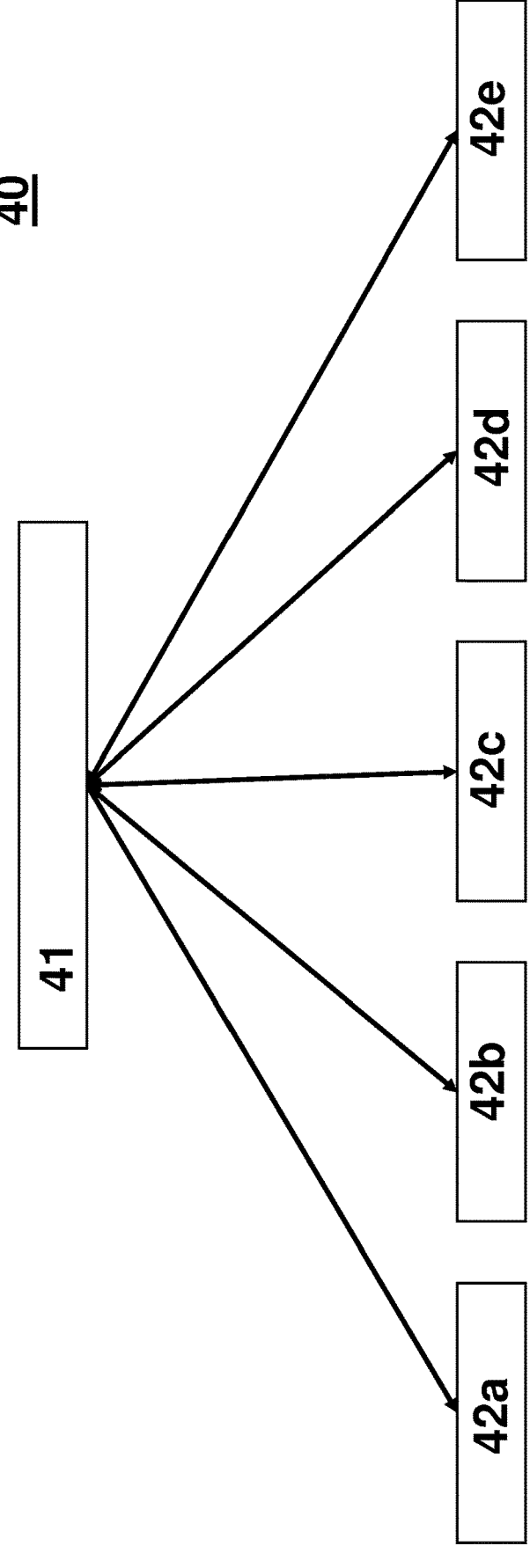
FIG. 4 is a schematic overview of a FRL system in accordance with aspects of embodiments.

FIG. 4 is a schematic overview of a FRL system 40, which may perform methods in accordance with aspects of embodiments. The FRL system 40 of FIG. 4 comprises a single central node 41 and a plurality of worker nodes 42a, 42b, 42c, 42d and 42e (collectively referred to using the reference sign 42). The FRL system 40 of FIG. 4 shows five worker nodes 42; those skilled in the art will appreciate that larger or smaller numbers of worker nodes may be used. Some FRL systems may also incorporate plural central nodes, which may be of particular use when modelling very complex environments.

As indicated by the arrows in FIG. 4, each of the worker nodes 42 may communicate with the central node 41, but there are no direct lines of communication between worker nodes 42. As explained above, allowing worker nodes to retain control of potentially sensitive data means that the data may be used in the machine learning processes without potentially causing security issues (as may result if sensitive data were shared between worker nodes). In some aspects of embodiments the central node and the worker nodes may be co-located, that is, may be contained within the same physical apparatus. However, typically the central node and worker nodes are located separately from one another, and communicate with one another using a suitable communication means (such as a wireless telecommunications system, wired telecommunications system, and so on). Whether or not the central node and one or more of the worker nodes may be co-located may depend on the trust model between the respective nodes. In the embodiment shown in FIG. 4, there is trust for the central node to know inner details of each of the workers models but not for each worker node to learn from each other—privacy between workers but trust in the central node. If the central node and one or more worker nodes were co-located, that would make the one or more worker nodes more privileged than worker nodes that were not co-located.

In some aspects of embodiments the FRL system 40 may form part of a wireless communication network such as a $3^{rd}$ Generation Partnership Project (3GPP) $4^{th}$ Generation (4G) or $5^{th}$ Generation (5G) network. Where the FRL system 40 forms part of a wireless communications network, the central node and worker nodes may be co-located and/or may be located in suitable components of the network. In some aspects of embodiments, the central node 41 may form part of a Core Network Node (CNN), and the worker nodes 42 may each form part of a base station (which may be 4th Generation, 4G, Evolved Node Bs, eNB, or 5th Generation, 5G, next Generation Node Bs, gNBs, for example).

In operation, a central computing device/central node 41 (such as a master node or leader node, potentially located in a network component such as a CNN where the FRL system 40 forms part of a wireless communication network) receives one or more episodes detailing the changes to an environment to be modelled. Each of the one or more episodes can then be analysed by the central device 41 to extract the individual observations. The observations can then be grouped into a plurality of groups of similar observations, and then the groups of similar observations can each be used to train a different ML agent in a worker node 42 (which may be or form part of a base station or a UE, for example). As a result of this training, the different ML agents may each generate a different ML model for the environment. One or more of the different models (or information from the one or more different models, such as weights and biases information) may then be obtained by the central device/central node 41, and used to obtain a central ML model. The methods may allow different ML agents (potentially in different worker nodes 42) to specialise in different aspects of the environment, such that specialized agents are created to handle potential critical cases. By integrating aspects of FL and RL methods, the present disclosure tackles the exploration complexity which can hinder existing FL only and RL only approaches when used to model complicated environments, while supporting advantages of both FL and RL such as minimising or avoiding communication directly between ML agents.

Figure 5A:
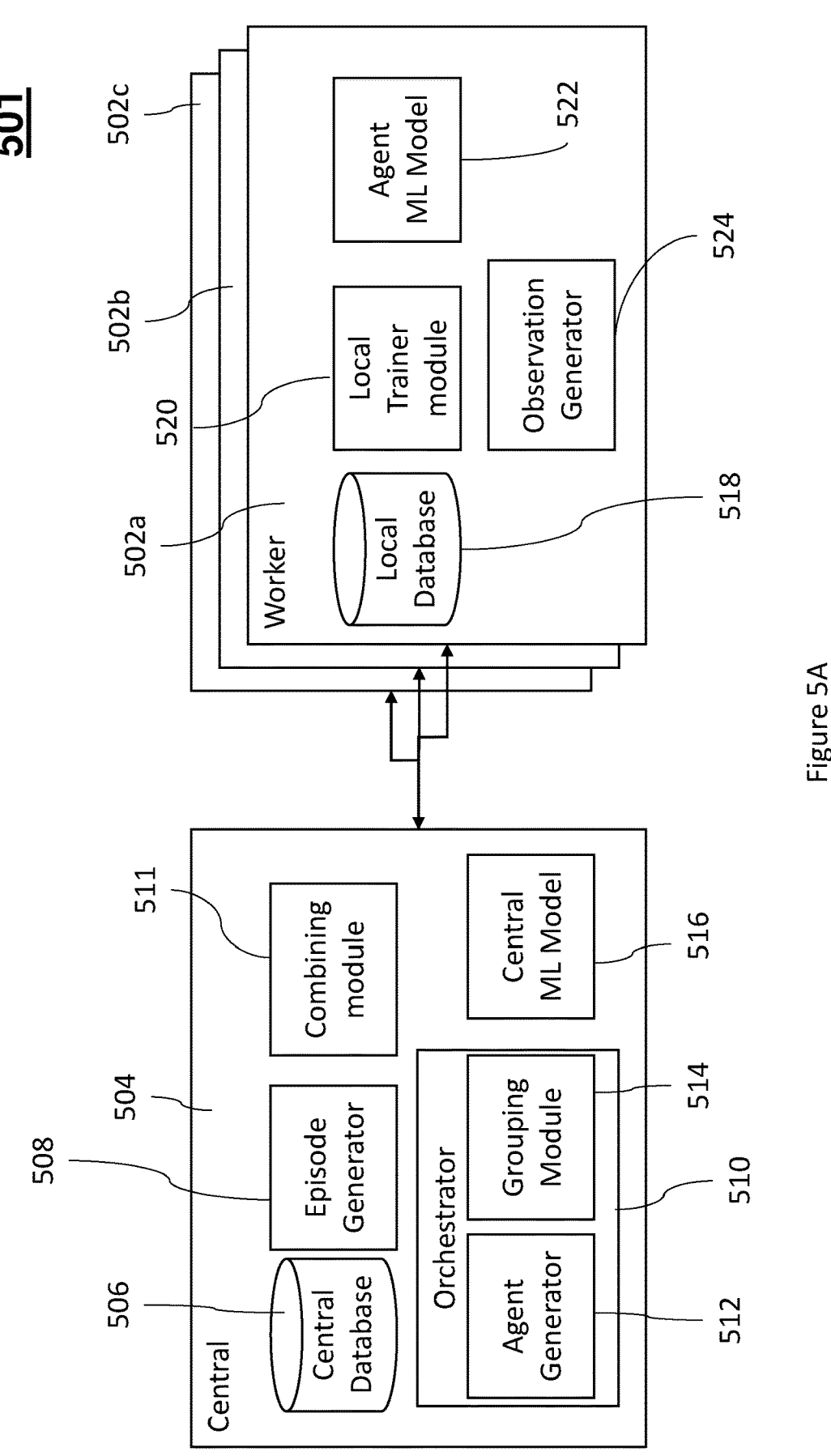
FIGS. 5A and 5B are schematic diagrams of systems in accordance with aspects of embodiments.
Figure 5B:
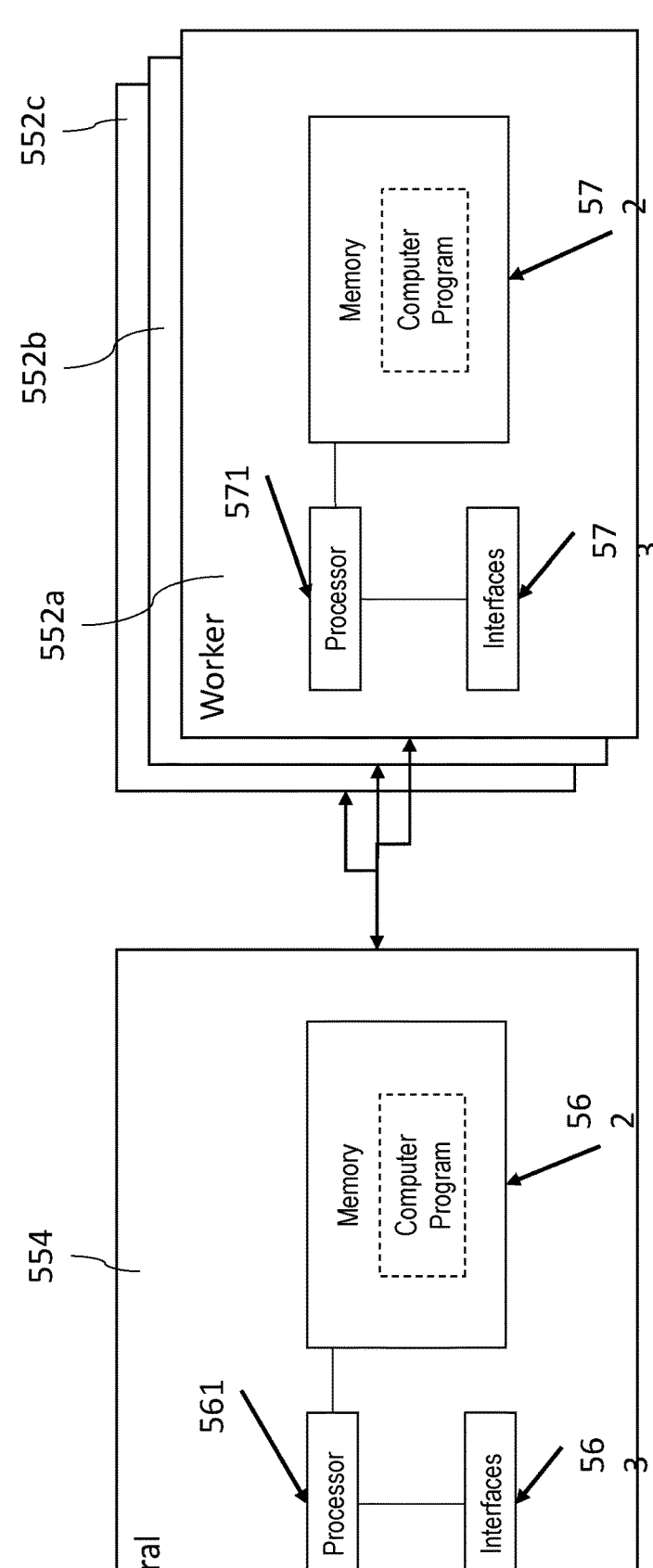
Figure 5C:
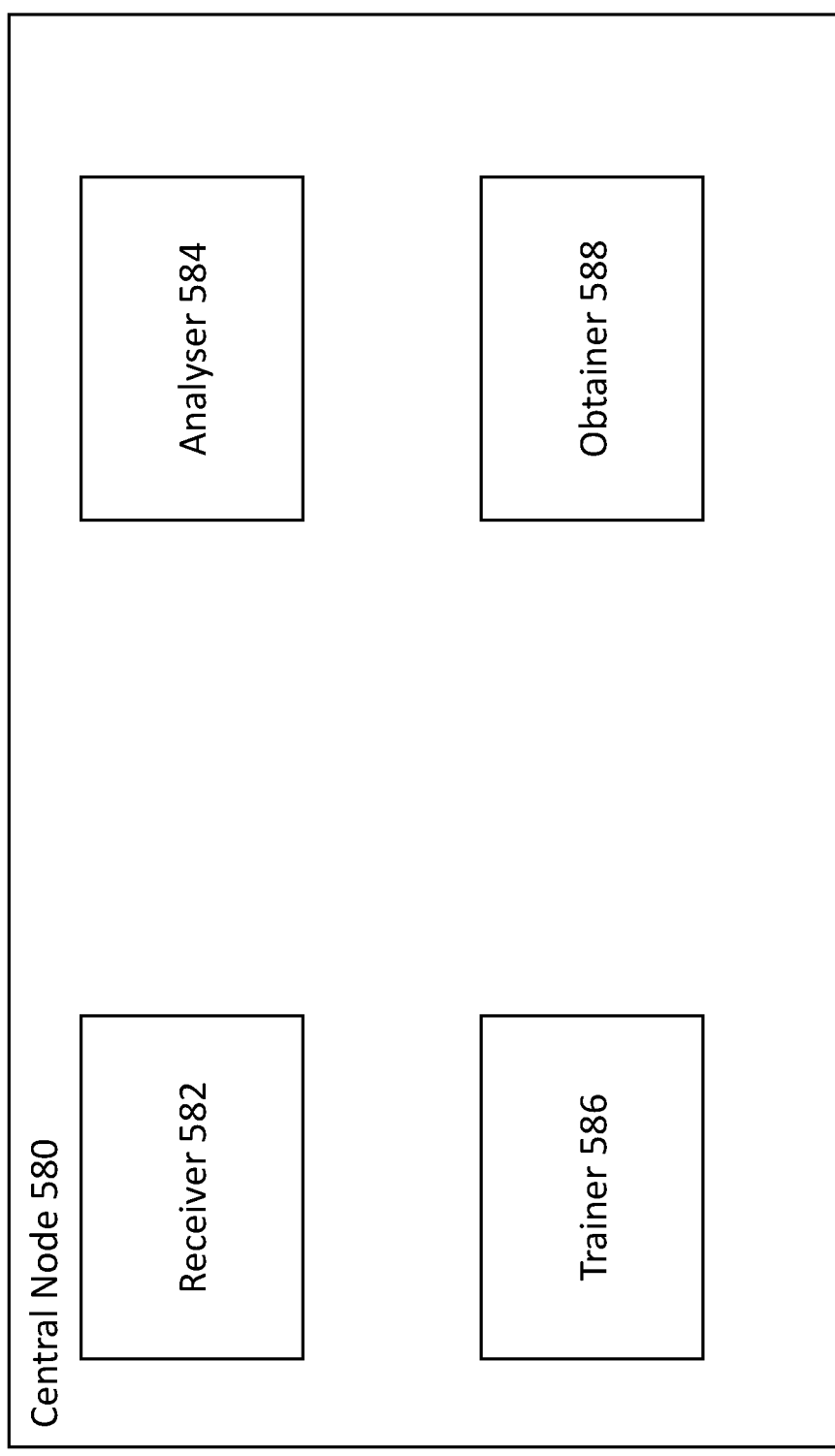
FIG. 5C is a schematic diagram of a central node in accordance with aspects of embodiments.

As mentioned above, the method shown in FIG. 3 may be performed by a central node. Any suitable central node may be used, for example, central node 41 of FIG. 4. FIG. 5A and FIG. 5B show further systems 501, 551 in accordance with aspects of embodiments, and FIG. 5C shows a central node 580 in accordance with aspects of embodiments. The systems 501, 551 may perform the method of FIG. 3; the method may be performed by central node 504 of FIG. 5A, central node 554 of FIG. 5B or central node 580 of FIG. 5C.

As shown in step S302 of FIG. 3 the method comprises receiving, at a central node 504, 554, 580, at least one episode comprising a plurality of changes of an environment. The information used to form the one or more episodes may be received from the environment (system); for example, where the system is implemented in a wireless communications network, information used to form the episodes may be sent to a CNN comprising the central node 504, 554, 580 from base stations comprising the worker nodes 502, 552, or from other network components. Once received by the central node 504, 554, 580 the received information may be stored in a central database, such as central database 506 of FIG. 5A. The central node 504, 554, 580 may then access the information stored in the central database and form the information into episodes; as illustrated in FIG. 5A this process may be performed using an episode generator 508 storing data in a central database 506.

Alternatively, central node 554 as shown in FIG. 5B may receive the at least one episode in accordance with a computer program stored in a memory 562, executed by a processor 561 in conjunction with one or more interfaces 563. Alternatively, receiver 582 of central node 580, as shown in FIG. 5C, may perform the receiving. In some aspects of embodiments the central node 504, 554, 580 may receive data in the form of episodes, that is, the steps of forming information into episodes may be performed prior to the information arriving at the central node 504, 554, 580. As explained above, an episode comprises all of the changes to an environment within a given time period (T). Accordingly, information may be divided into episodes based on the time period to which it relates.

In addition to receiving the episode(s) the central node 504, 554, 580 may also trigger the generation of a plurality of ML agents. Where the ML agents are co-located with the central node 504, 554, 580 (contained within the same physical apparatus), the central node may trigger generation of the ML agents within that apparatus. Alternatively, and as shown in FIG. 5, the ML agents may be located separately from the central node 504, 554, 580, for example in worker nodes 502, 552. Where the ML agents are located in worker nodes 502, 552, the central node 504, 554, 580 may trigger the generation of the ML agents, with the generation being performed by the worker nodes 502, 552. In particular, the generation of the ML agents may be performed by an agent generator 512 as shown in FIG. 5A, or by a computer program stored in a memory 562, executed by a processor 561 in conjunction with one or more interfaces 563 as shown in FIG. 5B.

When the one or more episodes have been received, the episode(s) may then be analysed to extract observations, as shown in step S304 of FIG. 3. The analysis may be performed by the central node 504, 554, 580, and/or may be performed by the ML agents (which, as discussed above, may form part of the central node 504, 554, 580). Where the ML agents analyse the episodes, an observation generator 524 may be used for this task. The participation of the ML agents in the observation extraction may assist in the training of the ML agents, as this help the ML agents specialise in a particular subset of tasks (related to a subset of observations). The task may also be performed in accordance with a computer program stored in a memory 572, executed by a processor 571 in conjunction with one or more interfaces 573. Alternatively, analyser 584 of central node 580, as shown in FIG. 5C, may perform or coordinate the analysis.

As discussed above, each observation typically relates to a change of the environment (system) between an initial state (s) and a final state (s'), along with the action (a) which led to the change between initial and final states and the effect of the change (as indicated by a reward, r). The nature of the change in the environment, the action leading to change, and the reward, are all dependent upon the particular system which the method is used to model. In some embodiments, it may be convenient for the observations to take the form of tuples of the form (s,a,r,s'). Some embodiments may also or alternatively store the observations when extracted, for example, in an observation pool hosted by local database 518 or memory 572. If used, an observation pool may be populated with a number (K) of episodes each of which is a sequence of observations which collectively span a given time (T), each observation being a tuple of the form (s,a,r,s').

Once extracted, the observations may then be grouped into groups of similar observations (see step S304). A plurality of groups of similar observations may be formed. The grouping may be performed, for example, by a grouping module 514, as shown in FIG. 5A, or by a computer program stored in a memory 562, executed by a processor 561 in conjunction with one or more interfaces 563 as shown in FIG. 5B. Alternatively, analyser 584 of central node 580, as shown in FIG. 5C, may perform the grouping. In aspects of embodiments, the grouping may be performed using machine reasoning techniques, including logic based mechanisms. A rule-based mechanism may be implemented to encode domain-specific instructions on how the observations are to be interpreted and represented with a symbolic representation. Such symbolic representation is described in terms of domain concepts and would enable deriving various (logical) conclusions that mimic the domain experts' thought processes and actions. An example of a suitable machine reasoning technique would involve a set of hierarchical conditions used to form the basis for a similarity assessment, with the criteria and hierarchy of criteria determined by a domain expert. Using dummy observations relating to a dummy environment having variables X and Y, each of which has a numerical range between 1 and 100, a hierarchy of conditions may specify that observations are first grouped according to the value of X in brackets of 10 (for example, $1 \leq X < 10$ as a bracket, $10 \leq X < 20$ as a further bracket, and so on), and then within the groupings according to X value, grouped according to Y value in brackets of 20. The exact nature of the hierarchical conditions is dependent on the system being modelled, and would typically be created using input from a domain expert; returning to the example discussed above a domain expert may have indicated that X is a more important measure of similarity in the given dummy environment than Y, and based on this information the hierarchy of conditions may place greater importance on X than on Y (as discussed above, grouping by X prior to grouping by Y). The domain expert may manually encode the hierarchy of conditions. Other similarity grouping techniques may additionally or alternatively be used, for example, based on representing characteristics of observations in vector space and calculating the Euclidean distance between vectors as a measure of similarity. In some aspects of embodiments the environment may be a $3^{rd}$ Generation Partnership Project, 3GPP, network, and the observations may be grouped based on Key Performance Indicator, KPI, degradation metrics; aspects of embodiments using KPI degradation metrics are discussed in greater detail below.

When the groups of similar observations have been created, the groups may then be used to train the machine learning agents (see S306). In particular, each group of observations may be used by to train a respective ML agent. Although any suitable training method may be used, RL may be particularly suitable for training the ML agents, due to the nature of the training data provided by the groups of similar observations. The training may, for example be performed by a local trainer module 520 on an agent ML model 522 coordinated by the central node 504 as illustrated in FIG. 5A, or by a computer program stored in a memory 562, executed by a processor 561 in conjunction with one or more interfaces 563 and coordinated by central node 554 as shown in FIG. 5B. Alternatively, trainer 586 of central node 580, as shown in FIG. 5C, may perform or coordinate the training.

The use of groups of similar observations in the training process may result in a plurality of ML agent models 522, each of which is specialised in different types of environment situations and may therefore be used to propose a suitable action to perform should a similar situation occur. As such, it may be desirable if the plurality of ML agent models 522 collectively may specialise in all common types of environment situation, such that at least one of the plurality of models may be used to propose a suitable action in any common environment situation.

When the respective ML models have been trained using the groups of similar observations, the trained ML agents may then output the trained agent ML models 522 to the central node 504, 554, 580 (see S308). Where the trained ML agents are co-located with the central node, the trained agent ML models are retained in the central node. The provision of a ML model 522 may comprise providing weights and biases used in the model. The central node 504, 554, 580 may obtain a trained ML model 522 from each of the trained ML agents, or a subset of the trained ML agents may provide a trained model 522 (including a situation wherein a single ML agent outputs a trained ML model 522 to the central node 504, 554, 580). Where a subset of the agents may provide trained ML models 522, this subset may be based on quality criteria for the model performance (with only models satisfying the criteria provided), based on levels of similarity with other provided models, or any other suitable selection means. An example of a quality criteria which may be used to select trained models may be the average reward obtained by the models during training, with only trained models providing above a threshold average reward being provided to the central node.

Once the central node 504, 554, 580 has received the output(s) from one or more ML agents, the central node may then obtain a central ML model 516 based on the output(s), as shown in step S308. Where a single ML model 522 is provided by a trained ML agent, the central node may obtain a central ML model 516 based on that ML model. Alternatively, where a plurality of ML models 522 are obtained by the central node, the central node may obtain the central ML model using the plurality of obtained ML models. Although the central node may simply select one of the obtained ML models as the central ML model 516, or retain each model for use in isolation depending on a state of an environment for which a proposed action is required, typically the central node may combine the obtained ML models in order to arrive at the central ML model 516.

In order to combine the obtained ML models, the central node may use a combining module 511, as shown in FIG. 5A, or a computer program stored in a memory 562, executed by a processor 561 in conjunction with one or more interfaces 563 as shown in FIG. 5B. Alternatively, obtainer 588 of central node 580, as shown in FIG. 5C, may perform the combining. The combining may comprise averaging the obtained ML models to provide a single combined model. In some aspects of embodiments a weighted averaging procedure may be used, wherein each obtained ML model is weighted (based, for example, on total obtained reward during training, average obtained reward per action during training, number of observations used in training, and so on) before the models are combined. As an alternative to averaging the obtained models, selected portions of the different ML models may be combined, that is, a portion of a first obtained ML model may be combined with a (different)

portion of a second obtained ML model and so on. The selection may be made by the 562, executed by a processor 561 in conjunction with one or more interfaces 563 as shown in FIG. 5B. In some aspects of embodiments that select portions of different ML models when forming the central ML model, the selection may be made by a selection machine learning model; the selection machine learning model may be a ML model with the specific purpose of selecting portions of the obtained models to form the central ML model, and may form part of the combining module 511 (where a combining module 511 is used). The selection may be made based on the respective results obtained by the obtained ML models. The selection may comprise a stacking process (also known as meta ensembling), in which the central ML model takes results from the obtained ML models and weights the results proportionally, thereby providing a combined result that is intended to outperform any of the results from individual obtained ML models due to the ability of the stacking process to smooth differences between the models, emphasise the portions of the obtained ML models that perform best and reduce the influence of the portions of the obtained ML models that perform poorly.

When a central ML model 516 has been formed, by the combining module 511 or otherwise, the central ML model 516 may then be used to propose actions which may be performed depending on the state of the modelled environment. The actions proposed will depend on the nature of the environment (system) that is modelled. As a result of the process by which the central ML model is formed, the modelling of the environment may be superior to that provided by a standard ML model, and as a consequence the actions proposed may be more beneficial. The central ML model may also be used as a starting point by one or more ML agents if another round of training using observations is to be performed (as discussed above). Aspects of embodiments allow the individual agent ML models to diverge from one another (and become specialised in particular environment states, for example), and as a result the combination of the plural trained ML models may be more effective than a model trained using traditional ML techniques.

In aspects of embodiments, a ML model for use in addressing Key Performance Indicator (KPI) degradation problems in a communication network, such as a $3^{rd}$ Generation Partnership Project (3GPP) communication network, may be developed. Examples of KPI may include signal to noise ratios (SNR), latency (delays in signal propagation), throughput (amount of data processed), and so on. KPIs are a measure of a quality of communications service provided to users of a communication network, so maintaining a certain standard of KPI is of some importance to operators of communication networks.

With specific reference to the monitoring of degradation in throughput for components (such as base stations, eNB, gNb) in communication networks, Table 1 shows a series of values some or all of which may be used in communication networks in order to detect throughput degradation. Additional information on the values shown in Table 1 can be found, for example, in 3GPP TS 38.323 v 15.5.0, available at https://portal.3gpp.org/desktopmodules/Specifications/SpecificationDetails.aspx?specificationId=3196 as of 17 Aug. 2020.

TABLE 1

| pmPdcpVolDlDrb | The total volume (Packet Data Convergence Protocol Service Data Units, PDCP SDU) on Data Radio Bearers that has been transferred (acknowledged by the UE) in the downlink direction. Unit: kilobit (1000 bits) |

TABLE 1-continued

| pmPdcpLatTimeDl | Aggregated Download (DL) Latency for a measurement period. The effective DL Latency time comprises the time from PDCP Data Radio Bearer (DRB) SDU entering the buffer until the first data has been transmitted to the UE. Unit: ms |
|---|---|
| Throughput_label | Target label |
| pmRaAttCbra | pmRaAttCbra: The number of detected contention-based random access preambles. Condition: This counter should be incremented whenever a Contention Based Random Access Channel (CBRA) preamble is detected in the Cell. Counter is reset after measurement period: Yes Counter type: PEG Scanner: Not included in any predefined scanner Unit: —' |
| pmPdcpLatPktTransDl | Number of DRB packets for downlink Latency measurements. |
| pmS1SigConnEstabSuccMod | The total number of successful S1 signalling connection establishments with Establishment cause Mobile Originating Data. Unit: — Condition: Stepped at the first occurrence of reception of any message on this S1 logical connection, if the Radio Resource Control (RRC) Connection Request Establishment cause was Establishment cause Mobile Originating Data. Counter type: PEG Sampling rate: — Scanner: Primary Counter is reset after measurement period: Yes |
| pmRadioTbsPwrRestricted | The number of Transport Blocks on Medium Access Control (MAC) level scheduled in uplink where the UE was considered to be power limited. Condition: A Transport Block is considered to be power limited when the estimated required transmit power is higher than the UE maximum transmit power. Counter is reset after measurement period: Yes Counter type: PEG Scanner: Not included in any predefined scanner Unit: —' |
| pmSessionTimeUe | This counters shows the accumulated active session time for all UEs in a cell. Unit: s |
| pmSinrPuschDistr | Distribution of the Signal to Interference Ratio (SINR) values calculated for Physical Uplink Shared Channel (PUSCH). Probability Density Function (PDF) ranges: [0]: SINR <= −5 [1]: −5 < SINR <= −2 [2]: −2 < SINR <= 2 [3]: 2 < SINR <= 6 [4]: 6 < SINR <= 10 [5]: 10 < SINR <= 14 [6]: 14 < SINR <= 17 [7]: 17 < SINR Condition: Each SINR value for a PUSCH transmission yields one sample in the distribution. Counter Type: PDF. Scanner: Not included in any predefined scanner. Unit: dB Counter is reset after measurement period: |
| pmRadioUeRepCqiDist | pmRadioUeRepCqiDistr: The reported Channel Quality Indicator (CQI) value from UEs in a distribution. PDF ranges: [0]: CQI = 0 [1]: CQI = 1 [2]: CQI = 2 [3]: CQI = 3 [4]: CQI = 4 [5]: CQI = 5 [6]: CQI = 6 [7]: CQI = 7 [8]: CQI = 8 [9]: CQI = 9 [10]: CQI = 10 [11]: CQI = 11 [12]: CQI = 12 [13]: CQI = 13 [14]: CQI = 14 [15]: CQI = 15 Condition: The corresponding sub-counter is stepped whenever a CQI report is received from a UE Counter is reset after measurement period: Yes Counter type: PDF Scanner: Not included in any predefined scanner Unit: —' |
| pmS1SigConnEstabSuccMod | The total number of successful S1 signalling connection establishments with Establishment cause Mobile Originating Data. Unit: — Condition: Stepped at the first occurrence of reception of any message on this S1 logical connection, if the RRC Connection Request Establishment cause was Establishment cause Mobile Originating Data. Counter type: PEG Sampling rate: — Scanner: Primary Counter is reset after measurement period: Yes |
| pmSinrPucchDistr | Distribution of the SINR values calculated for Physical Uplink Control Channel (PUCCH). PDF ranges: [0]: SINR <= −15 [1]: −15 < SINR <= −12 [2]: −12 < SINR <= −9 [3]: −9 < SINR <= −6 [4]: −6 < SINR <= −3 [5]: −3 < SINR <= 0 [6]: 0 < SINR <= 3 [7]: 3 < SINR Condition: Each SINR value for a PUCCH transmission yields one sample in the distribution. Counter Type: PDF. Scanner: Not included in any predefined scanner. Unit: dB Counter is reset after measurement period: |
| pmPdcpLatTimeDl | Aggregated DL Latency for a measurement period. The effective DL Latency time comprises the time from PDCP DRB SDU entering the buffer until the first data has been transmitted to the UE. Unit: ms |
| pmErabEstabAttInit | The total number of initial Evolved Universal Terrestrial Radio Access Network (E-UTRAN) Radio Access Bearer (E-RAB) Establishment attempts. Initial E-RABs are all E-RABs present in the S1 message Initial Context Setup Request. |
| pmRadioUeRepCqiDistr | pmRadioUeRepCqiDistr: The reported CQI value from UEs in a distribution. PDF ranges: [0]: CQI = 0 [1]: CQI = 1 [2]: CQI = 2 [3]: CQI = 3 [4]: CQI = 4 [5]: CQI = 5 [6]: CQI = 6 [7]: CQI = 7 [8]: CQI = 8 [9]: CQI = 9 [10]: CQI = 10 [11]: CQI = 11 [12]: CQI = 12 [13]: CQI = 13 [14]: CQI = 14 [15]: CQI = 15 |

TABLE 1-continued

Condition: The corresponding sub-counter is stepped
whenever a CQI report is received from a UE Counter is reset
after measurement period: Yes Counter type: PDF Scanner:
Not included in any predefined scanner Unit: —'

Figure 6A:
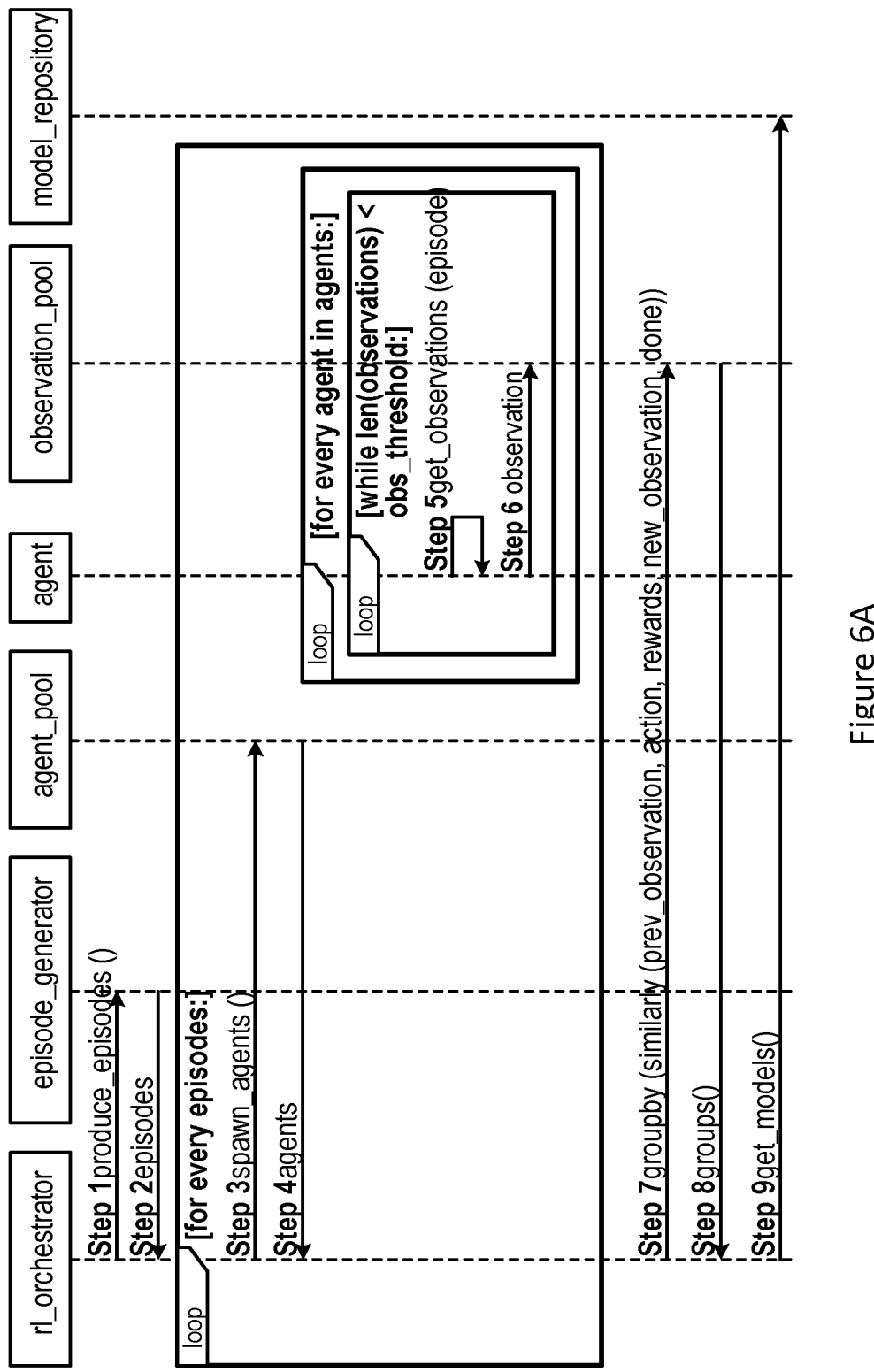
FIGS. 6A and 6B are a sequence diagram of a process for generating a central ML model in accordance with aspects of embodiments.
Figure 6B:
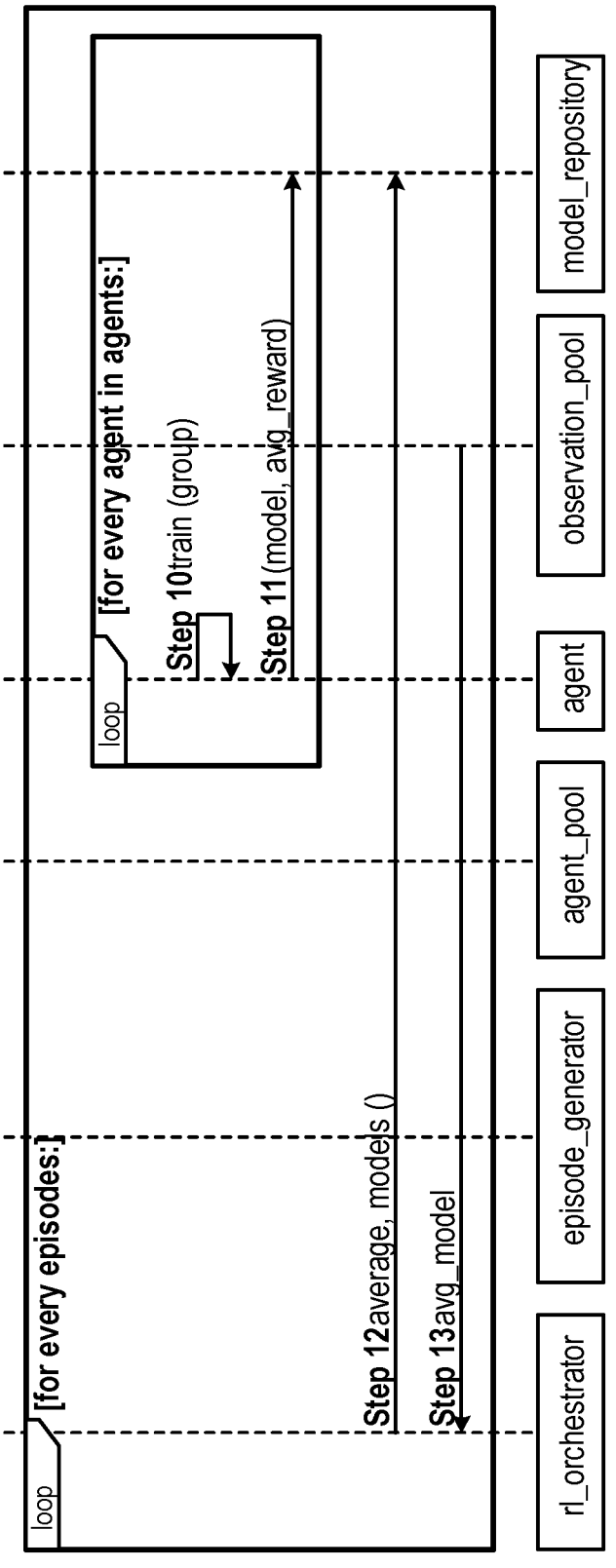

A process for generating a central ML model to propose actions to address KPI degradation, is illustrated in the sequence diagram of FIG. 6A and FIG. 6B (collectively FIG. 6). Using one or more of the values shown in Table 1 to represent the current state of a communications system (environment), one or more episodes may be obtained. An orchestrator may then request (step 1 of FIG. 6) and obtain (step 2) the episodes from an episode generator. The orchestrator may then cause the generation of a plurality of ML agents (step 3); in this embodiment the ML agents are provided by an agent pool (step 4). As discussed above in the context of FIG. 3, observations may then be extracted from the episodes using the ML agents (step 5), and stored in an observation pool (step 6). It is assumed for simplicity that three ML agents are used in the present embodiment; although the number of ML agents used will vary depending on the modelling requirements of given systems. In the present embodiment, the three ML agents (numbered 1, 2 and 3) specialise as follows:

ML agent 1 is specialised in critical cases where KPIs are deteriorating;

ML agent 2 is specialised in cases where KPIs are improving; and

ML agent 3 is specialised in cases where KPIs remain unchanged.

The ML agents may determine the nature of the cases they specialise in, taking into account the proximity of the ML agents to where the data is generated. ML agents that are close to the data may specialise in handling (and learning from) critical cases and label their samples accordingly.

The observations obtained are then grouped into groups of similar observations (see step 7 and 8). In this embodiment, a rule-based mechanism using one or more of the values set out in table 1 may be used to group the observations. Examples of potential criteria may therefore include change in SINR (see pmSinrPuschDistr) as a first criteria, followed by a second criteria of total number of initial E-RAB establishment attempts (see pmErabEstabAttInit). In order to provide the models (see step 9) the different groups may then be used to train the ML agents (see step 10 and 11), and then the trained ML models requested (step 12) and received (step 13) by the orchestrator.

The trained ML models are trained to become expert in different KPI situations as discussed above. The models may therefore be used in combination to provide a central model able to provide beneficial action proposals for situations where KPI values are increasing, stable or decreasing.

Aspects of embodiments allow the individual agent ML models to diverge from one another (in the process of becoming specialised), and as a result the combination of the plural trained ML models may be more effective than a model trained using traditional ML techniques. In the present aspect of an embodiment, suitable actions may include, for example, increasing or decreasing downlink power, shifting users between multiplexing schemes (such as open and closed loop multiplexing schemes) and so on. The consequence of the actions proposed may be that situations with decreasing KPI are arrested, situations with stable KPI are maintained or caused to provide improved KPI, and situations with improving KPI continue to improve.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure. For the avoidance of doubt, the scope of the disclosure is defined by the claims.

The invention claimed is:

1. A method for developing a machine-learning model, the method comprising:

receiving, at a central node, at least one episode comprising a plurality of changes of an environment;

analysing the episode to extract a plurality of observations and grouping the observations from among the plurality of observations into a plurality of groups of similar observations;

training a first machine learning agent using a first group of similar observations from among the plurality of groups of similar observations;

training a second machine learning agent using a second group of similar observations from among the plurality of groups of similar observations, wherein the second group of similar observations is different to the first group of similar observations; and obtaining, at the central node, a central machine-learning model based on an output from at least one of the trained first machine learning agent and the trained second machine learning agent.

2. The method of claim 1, wherein the central node is further configured to trigger a generation of a plurality of machine learning agents, the plurality of machine learning agents comprising the first machine learning agent and the second machine learning agent.

3. The method of claim 2, wherein the plurality of machine learning agents analyse the episode to extract observations.

4. The method of claim 3, wherein:

each observation is a tuple of the form (s,a,r,s') where s is the state of the environment prior to performing an action, a is an action, r is the reward that the machine learning agent analysing the episode would receive based on action a, and s' is the state of the environment following action a; and the observations are stored in an observation pool.

5. The method of claim 1, wherein the observations are grouped according to similarity using machine reasoning techniques.

6. The method of claim 5 wherein the machine reasoning techniques comprise logic based mechanisms.

7. The method of claim 1, wherein the central node obtains a first machine learning model from the trained first machine learning agent and a second machine learning model from the trained second machine learning agent.

8. The method of claim 7, wherein the central node combines the first machine learning model and the second machine learning model to obtain the central machine learning model.

9. The method of claim 8, wherein the first machine learning model and the second machine learning model are combined by averaging the models.

10. The method of claim 9, wherein the first machine learning model and the second machine learning model are combined by averaging the models using a weighted average, a weight of each model being based on the total reward obtained by the model during training of the respective model using a respective group of similar observations.

11. The method of claim 7, wherein the first machine learning model and the second machine learning model are combined by selecting portions of the first machine learning model and portions of the second machine learning model.

12. The method of claim 11, wherein the selection of portions is controlled by a selecting machine learning model.

13. The method of claim 1, wherein the first machine learning agent and second machine learning agent are trained using reinforcement learning.

14. The method of claim 1, wherein the environment is a 3rd Generation Partnership Project, 3GPP, network, and wherein the observations are grouped based on Key Performance Indicator, KPI, degradation metrics.

15. The method of claim 14, wherein:

the first group of similar observations are observations indicating KPI deterioration and the second group of similar observations are observations indicating KPI improvement; and the method further comprises training a third machine learning agent using a third group of similar observations, the third group of similar observations indicating KPI stability.

16. The method of claim 14, wherein the central machine learning model is used to suggest a network modification to help address KPI degradation.

17. The method of claim 16, wherein the network modification comprises altering the downlink power of one or more base stations within the network and/or switching a multiplexing scheme of one or more users of the network.

18. A central node configured to develop a machine learning model, the central node comprising processing circuitry and a memory containing instructions executable by the processing circuitry, whereby the central node is operable to:

receive at least one episode comprising a plurality of changes of an environment;

initiate an analysis of the episode to extract a plurality of observations and group the observations from among the plurality of observations into a plurality of groups of similar observations;

initiate a training of a first machine learning agent using a first group of similar observations from among the plurality of groups of similar observations;

initiate a training of a second machine learning agent using a second group of similar observations from among the plurality of groups of similar observations, wherein the second group of similar observations is different to the first group of similar observations; and obtain a central machine-learning model based on an output from at least one of the trained first machine learning agent and the trained second machine learning agent.

19. The central node of claim 18, further configured to trigger a generation of a plurality of machine learning agents, the plurality of machine learning agents comprising the first machine learning agent and the second machine learning agent.

20. The central node of claim 19, wherein the plurality of machine learning agents analyse the episode to extract observations.

* * * * *